US012158162B2

(12) United States Patent
Gross et al.

(10) Patent No.: US 12,158,162 B2
(45) Date of Patent: Dec. 3, 2024

(54) INTERCHANGEABLE MODULAR CUTOFF FOR CENTRIFUGAL BLOWERS

(71) Applicant: REGAL BELOIT AMERICA, INC., Beloit, WI (US)

(72) Inventors: Anthony Joseph Gross, Cassville, MO (US); Steve A. Trimble, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 18/364,093

(22) Filed: Aug. 2, 2023

(65) Prior Publication Data

US 2024/0035485 A1 Feb. 1, 2024

Related U.S. Application Data

(60) Provisional application No. 63/396,548, filed on Aug. 9, 2022.

(51) Int. Cl.
*F04D 29/42* (2006.01)

(52) U.S. Cl.
CPC ....... *F04D 29/422* (2013.01); *F04D 29/4226* (2013.01); *F05D 2230/51* (2013.01)

(58) Field of Classification Search
CPC ..... F04D 29/422; F04D 29/4226; F04D 17/16
See application file for complete search history.

(56) References Cited

U.S. PATENT DOCUMENTS

| | | | | |
|---|---|---|---|---|
| 2,841,326 A * | 7/1958 | Davis | F04D 29/422 | 415/97 |
| 5,092,136 A * | 3/1992 | Kang | F25D 17/045 | 137/872 |
| 5,997,246 A | 12/1999 | Humbad | | |
| 8,083,477 B2 * | 12/2011 | Hwang | F04D 29/422 | 415/206 |
| 9,068,573 B2 * | 6/2015 | Kuo | F04D 29/667 | |
| 11,215,193 B2 * | 1/2022 | Berberoglu | F04D 29/422 | |
| 2003/0039541 A1 | 2/2003 | Wargo | | |
| 2010/0040456 A1 | 2/2010 | Hwang | | |

FOREIGN PATENT DOCUMENTS

| | | | |
|---|---|---|---|
| CN | 104454647 A | 3/2015 | |
| DE | 102008051362 A1 | 4/2010 | |
| WO | WO-2022062030 A1 * | 3/2022 | |

* cited by examiner

*Primary Examiner* — Justin D Seabe
(74) *Attorney, Agent, or Firm* — Armstrong Teasdale LLP

(57) ABSTRACT

A centrifugal blower assembly including a blower housing having a scroll wall defining a blower chamber, the scroll wall extending circumferentially between a cutoff point to an end point defining a blower circumference, the blower housing further having a surface adjacent to the cutoff point; and a modular cutoff configured to attach to the surface of the blower housing, the modular cutoff having an abutting surface and a cutoff surface configured to extend the cutoff point of the blower by the cutoff surface to an extended cutoff surface. The abutting surface of the modular cutoff further includes an attachment feature configured to mate to an attachment feature of the blower housing.

12 Claims, 7 Drawing Sheets

INTERCHANGEABLE MODULAR CUTOFF FOR CENTRIFUGAL BLOWERS

CROSS-REFERENCE TO RELATED APPLICATIONS

This application claims priority to U.S. Provisional Patent Application No. 63/396,548 filed on Aug. 9, 2022, titled Interchangeable Modular Cutoff for Centrifugal Blowers, the entire contents of which are hereby incorporated herein by reference.

BACKGROUND

The field of the disclosure relates generally to a housing for a centrifugal fan, and more specifically, to an interchangeable modular cutoff for adjustable centrifugal blower discharge.

Centrifugal fans or blowers are commonly used in automotive, air handling, and heating, ventilation, and air conditioning industries for directing large volumes of forced air (this is often also a pull system like draft induction), over a wide range of pressures, through a variety of air conditioning components. In a known centrifugal blower, fluid (air, or air/gas mix) is drawn into a housing through one or more inlet openings by a rotating wheel. This air is then forced around the housing and out an outlet end that includes a cutoff point where a casing of the centrifugal blower intersects a discharge of the centrifugal blower. Known centrifugal blowers include an outlet including a fixed cutoff. These fixed cutoff geometries may not provide an optimal balance between performance and noise generation.

Therefore, there is a need in the art to optimize the cutoff design including: location, geometry, material, etc. to optimize the balance of blower performance (pressure, velocity, volumetric flow, efficiency, mixing quality for fuel mixing, flow uniformity, etc.) and noise.

BRIEF DESCRIPTION

In one aspect, a centrifugal blower assembly is disclosed. The centrifugal blower assembly includes a blower housing having a scroll wall defining a blower chamber, the scroll wall extending circumferentially between a cutoff point to an end point defining a blower circumference, the blower housing further having a surface adjacent to the cutoff point; and, a modular cutoff configured to attach to the surface of the blower housing, the modular cutoff having an abutting surface and a cutoff surface configured to extend the cutoff point of the blower by the cutoff surface to an extended cutoff surface.

DETAILED DESCRIPTION

Figure 1:
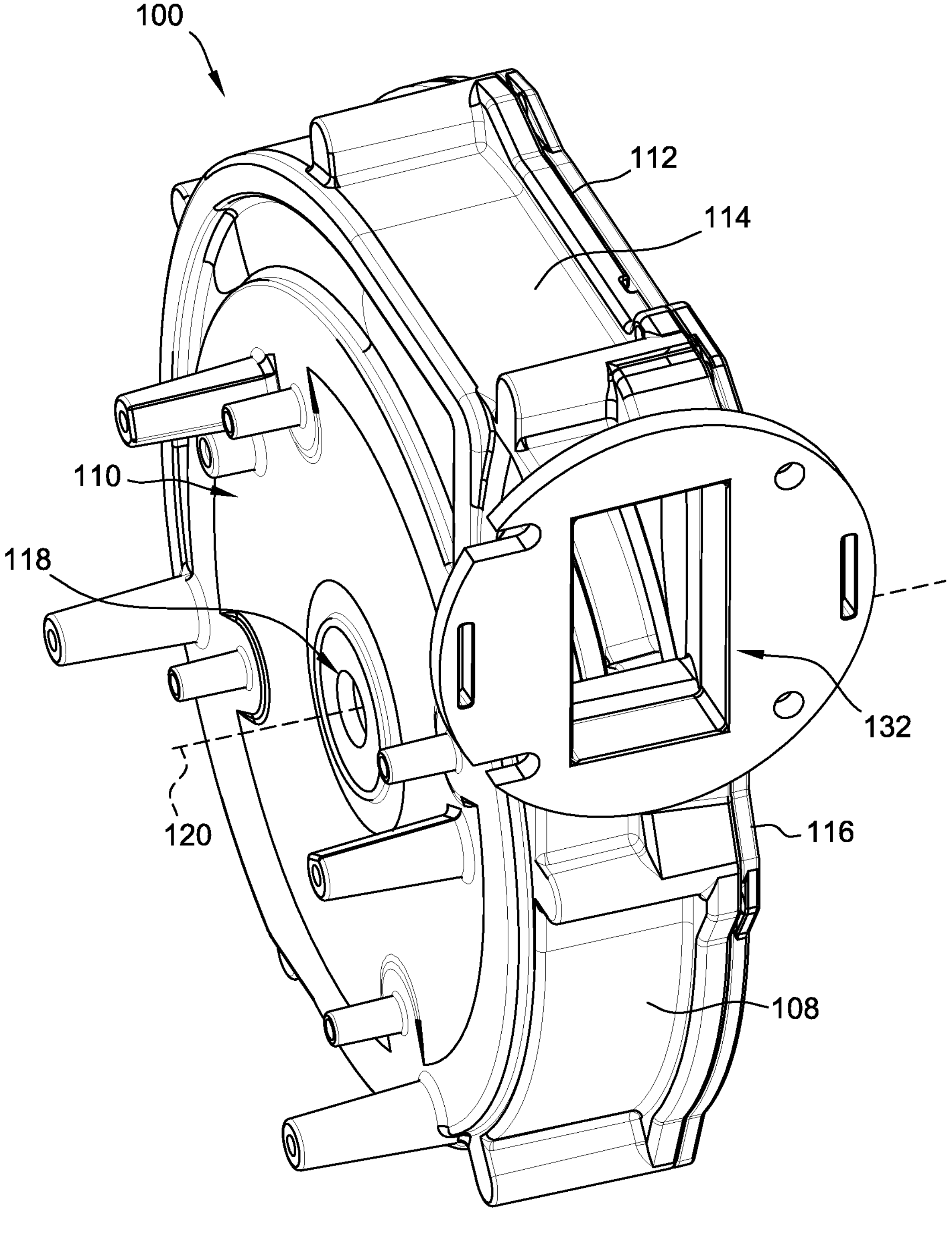
FIG. 1 is a perspective view of an exemplary blower assembly in accordance with one or more embodiments of the present disclosure.
Figure 2:
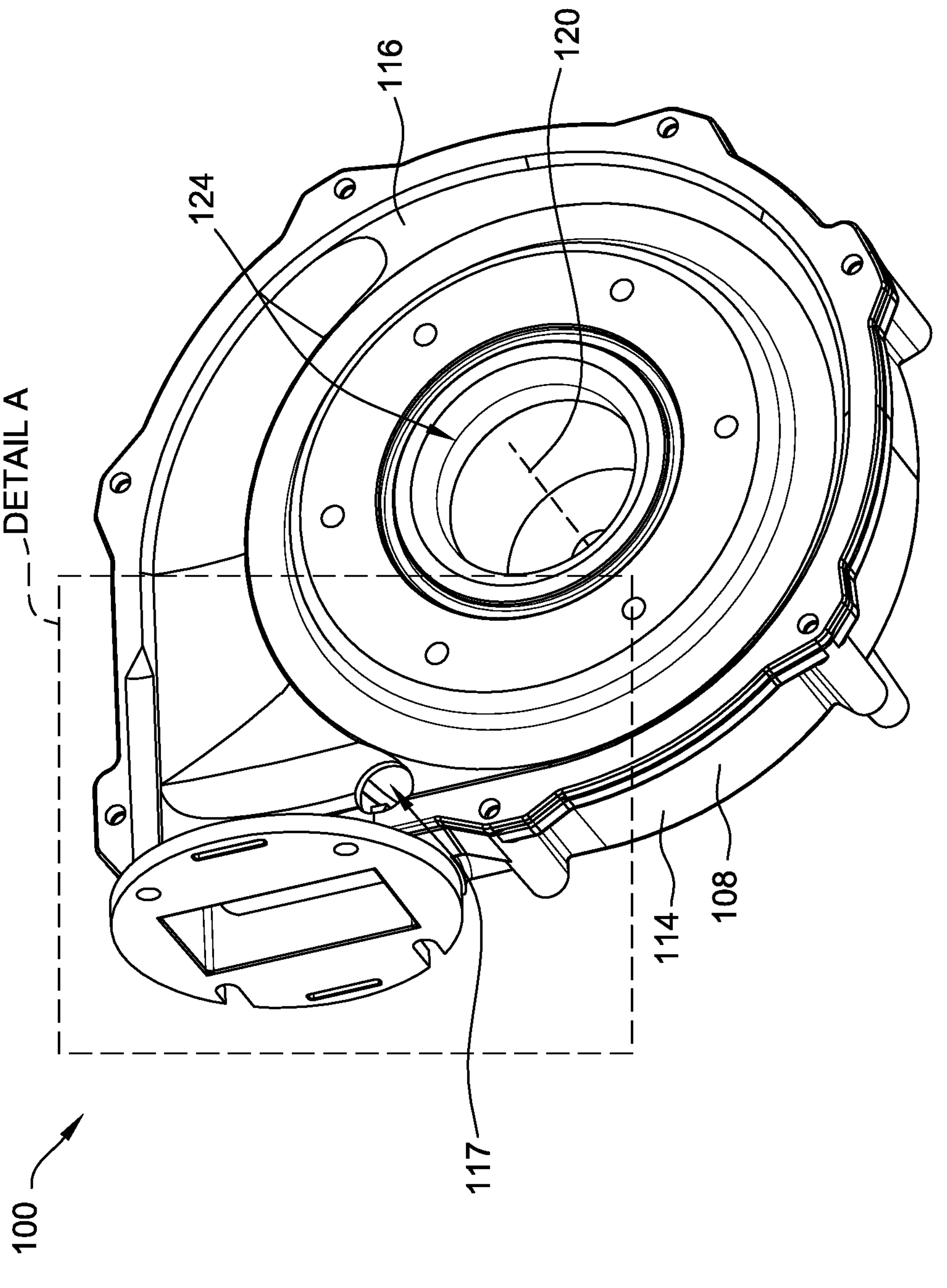
FIG. 2 is a right-side perspective view of the blower assembly shown in FIG. 1.
Figure 3:
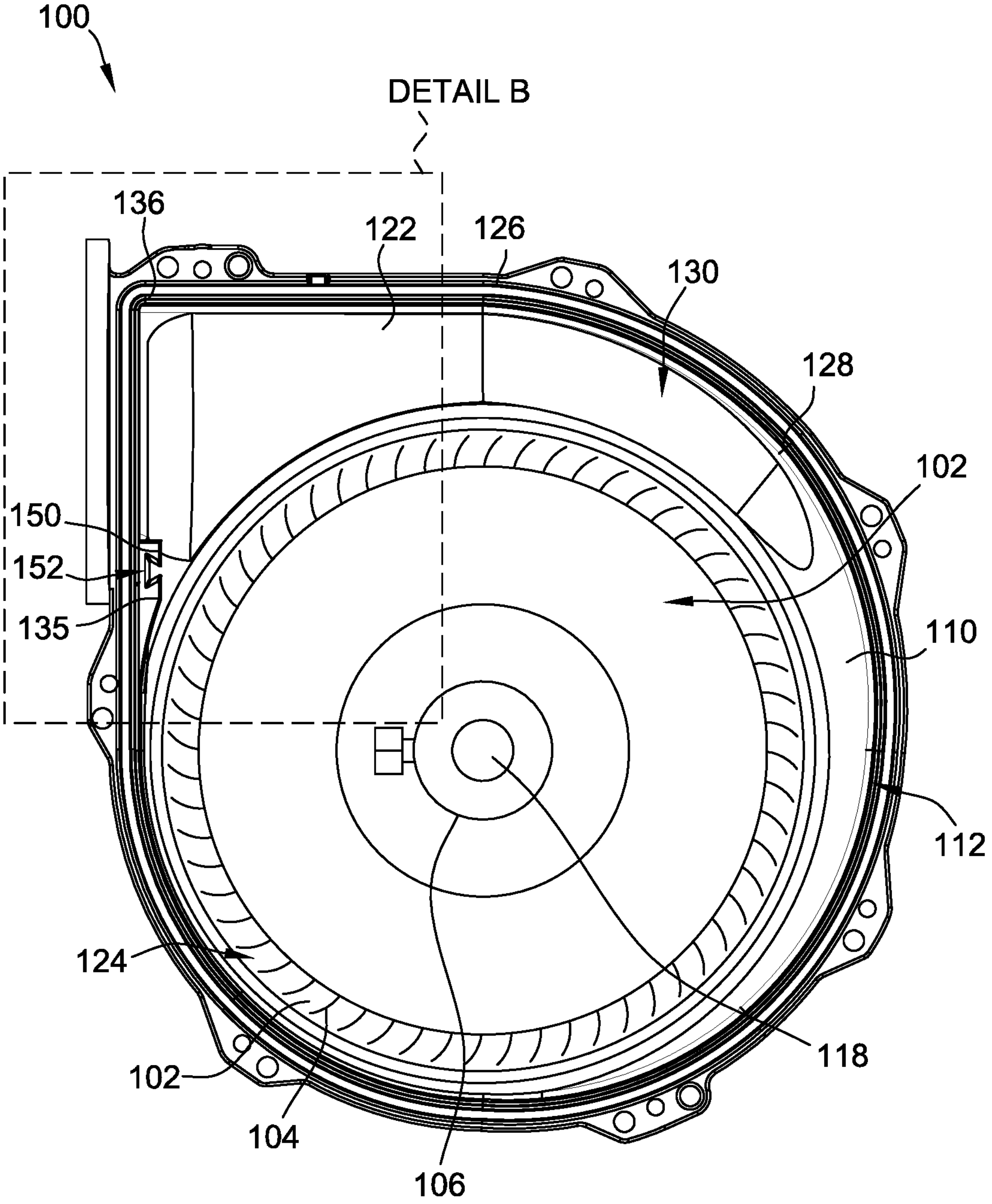
FIG. 3 is a right-side view of a housing of the blower assembly shown in FIG. 1, with a removable panel removed.

The embodiments described herein relate to a centrifugal fan housing. More specifically, embodiments relate to a centrifugal fan housing including a modular cutoff that is removable and replaceable. FIG. 1 illustrates a side perspective view of an exemplary embodiment of a centrifugal blower assembly 100. FIG. 2 is a right-side perspective view of centrifugal blower assembly 100 shown in FIG. 1. FIG. 3 is a right-side view of a housing of the centrifugal blower assembly 100 shown in FIG. 1 with a side panel 116 removed.

The blower assembly 100 includes a housing 108 and at least one wheel 102 disposed within the housing 108. The housing 108 includes a base 110 having a sidewall 114 and an open portion 112 opposite the base 110 defined by edges of the sidewall 114. A removable side panel 116 can be fastened to or otherwise attached to the open portion 112 and the sidewall 114, to enclose the housing 108 and define a blower chamber 130. The base 110 further includes an opening 118 through which a shaft (not shown) of a motor (not shown) can be inserted through.

The wheel 102 includes a plurality of fan blades 104 spaced circumferentially about the wheel 102, and a wheel hub 106. The shaft of the motor engages wheel hub 106 to facilitate rotation of wheel 102 about an axis 120 defined by the wheel hub 106. The removable side panel 116 includes an inlet 124 through which a volume of fluid is drawn into the chamber 130 of assembly 100 by wheel 102. The inlet 124 comprises a circular opening concentric to the axis 120 upon assembly of the removable side panel 116 to the housing 108. Rotation of wheel 102 facilitates drawing air through inlet 124, urging the drawn air around blower chamber 130, and exhausting it through an outlet 132. In the exemplary embodiment, blower assembly 100 includes a single wheel 102 and inlet 124, alternatively, blower assembly 100 may include more than one wheel and/or inlet.

The inner surface of the sidewall 114 defines a scroll wall 126 extending between the base 110 and the open portion 112 and defining a blower circumference 128. The scroll wall 126 (and the blower circumference 128) extends circumferentially from a cutoff point 135 about a blower chamber 130 to a scroll wall end point 136. Scroll wall 126 (and the blower circumference 128) is located a progressively greater radial distance from wheel 102 in the direction of rotation. The progressively increasing volume harvests the velocity of the fluid displaced from the wheel 102 to build pressure due to the scroll shape of blower chamber 130. Changing the cutoff point location 135 and cutoff geometry also changes the geometry of the blower circumference 128. Changing the geometry of the blower circumference 128 or the cutoff point 135 also changes performance characteristics of the blower assembly 100. Namely, changing the geometry of the blower circumference 128 at the cutoff point 135 or more generally anywhere along the scroll wall 126 can increase or decrease the velocity of the volume of air and thus change key performance characteristics of the blower (i.e. volumetric or mass flow rate, static pressure, fluid velocity, mixture quality, efficiency, fluid flow uniformity, etc.), and can conversely change acoustic noise generated by the blower assembly 100. As shown in FIG. 2, a surface 150 extends beyond the cutoff point 135 and adjacent to the blower circumference 128. The surface 150 includes an attachment feature 152 configured to receive a modular cutoff (not shown). As explained in further detail below, the modular cutoffs of the present disclosure are configured to change or alter the cutoff point 135 and surface geometry such that the blower 100 has different key performance characteristics, thereby increasing or decreasing the noise generated by the centrifugal blower 100. The modular cutoff can be attached to the attachment feature 152 by removing the side panel 116 to access the attachment feature 152. Alternatively, as shown in FIG. 2, in some embodiments, the side panel 116 can include an access opening 117 positioned above the attachment feature 152 of the housing 108 when the side panel 116 is attached to the housing 108.

Figure 4A:
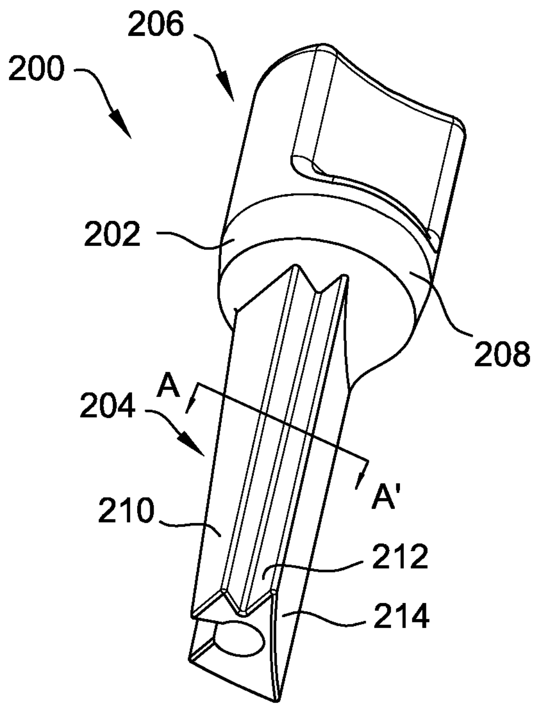
FIG. 4A is a perspective view of an exemplary modular cutoff in accordance with one or more embodiments of the present disclosure.
Figure 4B:
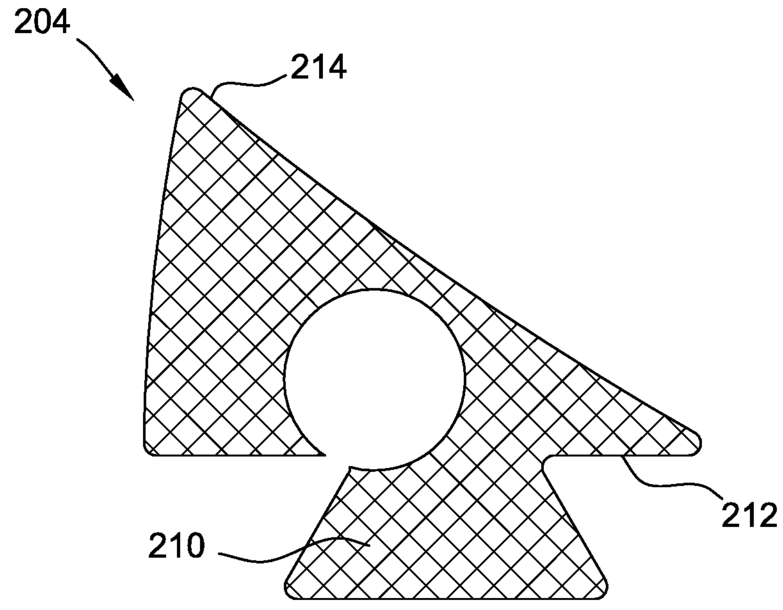
FIG. 4B is a cross-sectional view of the modular cutoff of FIG. 4A taken along cross-sectional line A-A'.
Figure 5:
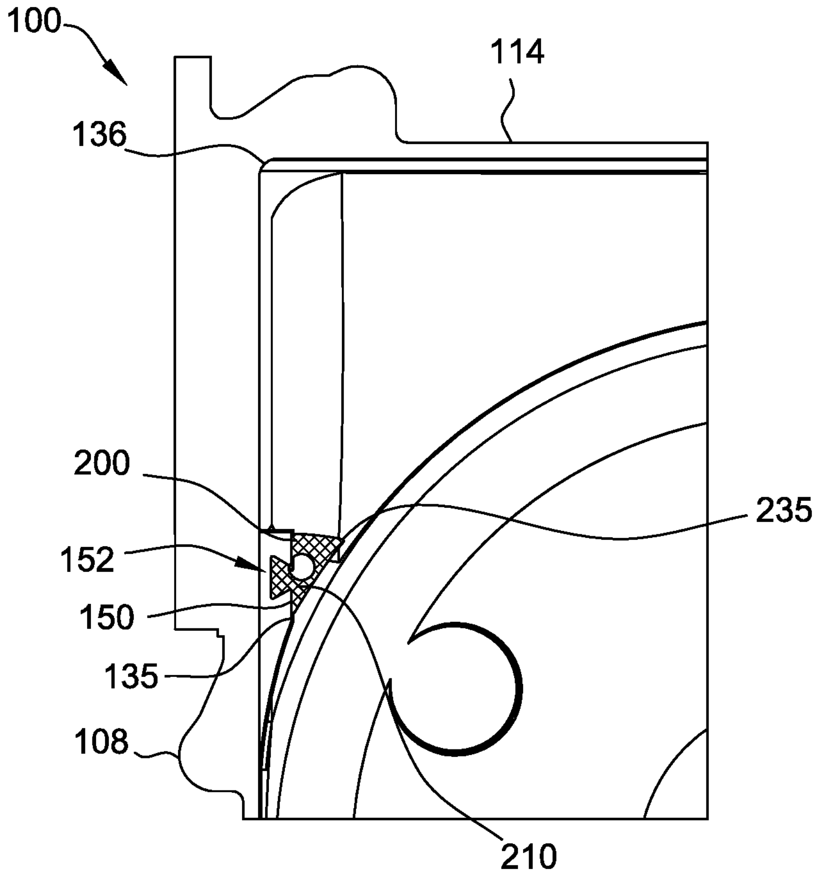
FIG. 5 is an enlarged front view of DETAIL B of the blower assembly shown in FIG. 3.
Figure 6:
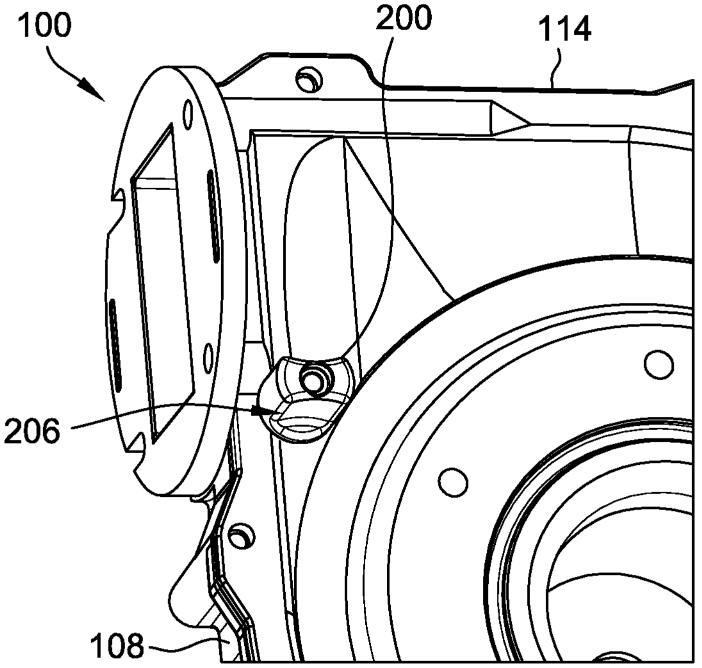
FIG. 6 is an enlarged perspective view of DETAIL A of the blower assembly as shown in FIG. 2.

FIG. 4A illustrates a perspective view of an exemplary modular cutoff 200, and FIG. 4B illustrates a cross-sectional view of the modular cutoff 200. FIG. 5 is an enlarged view of DETAIL B of the housing 108 as shown in FIG. 3. FIG. 6 is an enlarged view of DETAIL A of the blower assembly 100 as shown in FIG. 2. The modular cutoff 200 includes an elongate body 202 having a first portion 204 and a second portion 206. The first portion 204 is insertable into the access opening 117 positioned above the attachment feature 152 of the housing 108 when the side panel 116 is attached to the housing 108. The second portion 206 is configured as a handle by which a user can manipulate the modular cutoff 200 and insert the modular cutoff 200 into the access opening 117. In some embodiments, the second portion 206 includes a frustoconical surface 208 which creates an interference fit with the access opening 117 to prevent air from passing between the access opening 117 and the frustoconical surface 208. In some embodiments, the modular cutoff 200 only includes the first portion 204. In some embodiments, the modular cutoff 200 is secured in a direction of the axis 120 (of FIG. 2) by securing the removable side panel 116 to the housing 108. In such embodiments, the modular cutoff comprises first portion 204 and does not include the second portion 206.

The first portion 204 includes an abutting surface 212 and a cutoff surface 214. The abutting surface 212 contacts the surface 150 of the housing 108 when the first portion 204 is inserted into the access opening 117 and attached to the attachment feature 152 of the housing 108. In some embodiments, the first portion 204 further includes a corresponding attachment feature 210 extending from the abutting surface 212 of the first portion 204. The corresponding attachment feature 210 of the modular cutoff 200 is configured to interdigitate with the attachment feature 152 of the housing 108. In the illustrated embodiment, the attachment feature 152 of the housing 108 is a dovetail mortise and the corresponding attachment feature 210 of the modular cutoff 200 is a dovetail tenon sized and configured to interdigitate with the dovetail mortise. The shape of the attachment feature 210 of the modular cutoff 200 and the shape of the attachment feature 152 of the housing 108 can be any suitable interlocking shape or mating joinery geometry. Alternatively, the shape of the attachment feature 210 of the modular cutoff 200 and the shape of the attachment feature 152 of the housing 108 can be of any shape that enables blower assembly 100 to function as described herein.

As best shown in FIG. 5, the modular cutoff 200 is inserted into the attachment feature 152 of the housing 108. The cutoff surface 214 and more generally the modular cutoff 200 extends the cutoff point 135 of the scroll wall 126 to an extended cutoff surface 235, thereby circumferentially extending the blower circumference 128 up to the cutoff surface 214 of the modular cutoff 200. Thus, the modular cutoff 200 changes the geometry of the scroll wall 126 by extending the blower circumference 128 up to the cutoff surface 214.

Figure 7:
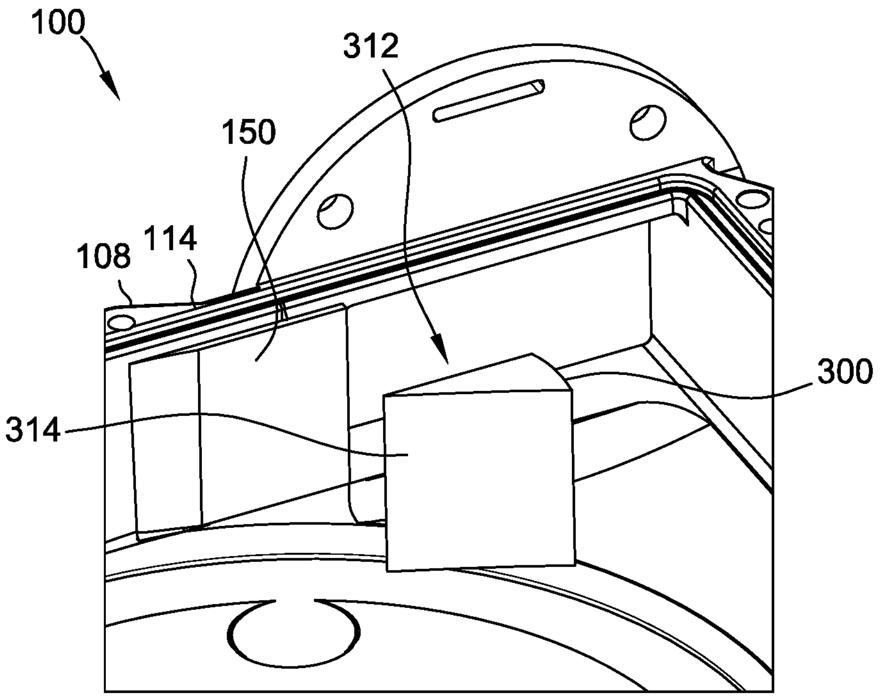
FIG. 7 is a perspective view of an exemplary modular cutoff in accordance with one or more embodiments of the present disclosure.
Figure 8:
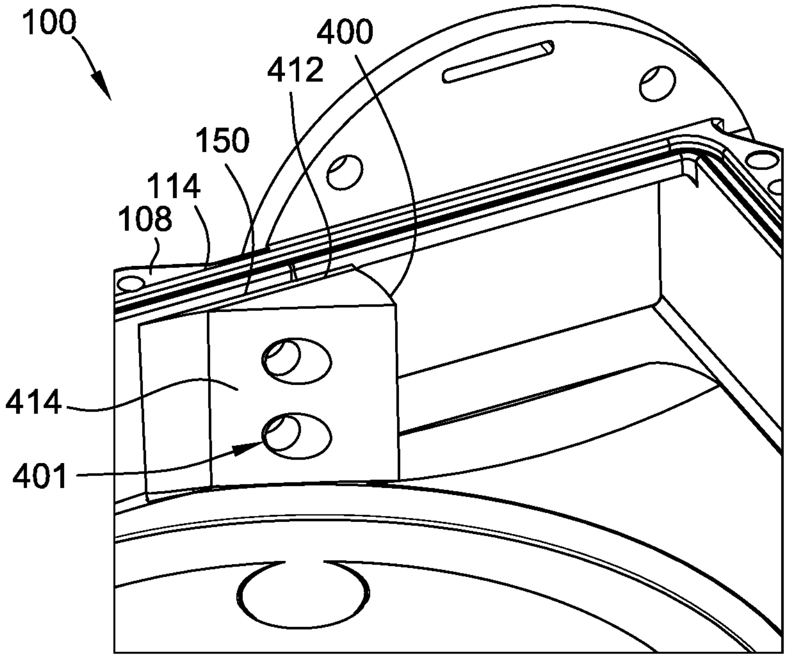
FIG. 8 is a perspective view of an exemplary modular cutoff in accordance with one or more embodiments of the present disclosure.

FIG. 7 illustrates an alternative embodiment of a modular cutoff 300, and FIG. 8 illustrates an alternative embodiment of a modular cutoff 400. Like components will be given like reference numerals for ease of understanding.

As shown in FIG. 7, the modular cutoff 300 includes an abutting surface 312 and an angled surface 314. The abutting surface 312 contacts the surface 150 of the housing 108. The abutting surface 312 of the modular cutoff 300 can be removably or non-removably secured to the surface 150 of the housing 108 by way of an adhesive or an interlocking connection. Likewise, as shown in FIG. 8, the modular cutoff 400 includes an abutting surface 412 and an angled surface 414. The abutting surface 412 abuts the surface 150 of the housing 108. The modular cutoff 400 includes at least one countersunk hole 401 for receiving a fastener (not shown) that can be threaded into corresponding holes (not shown) of the surface 150 of the housing 108. Alternatively, the modular cutoffs (300, 400) can be attached by any means to the surface 150 of the housing 108 that enables blower assembly 100 to function as described herein.

Figure 9:
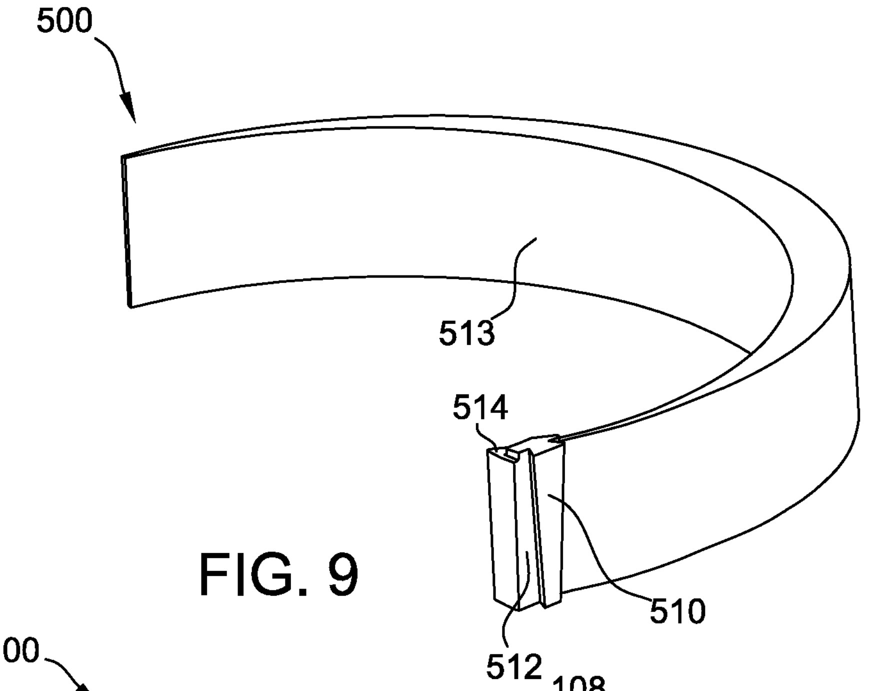
FIG. 9 is a perspective view of an exemplary modular cutoff in accordance with one or more embodiments of the present disclosure; and, FIG. 10 is a perspective view of the modular cutoff of FIG. 9.
Figure 10:
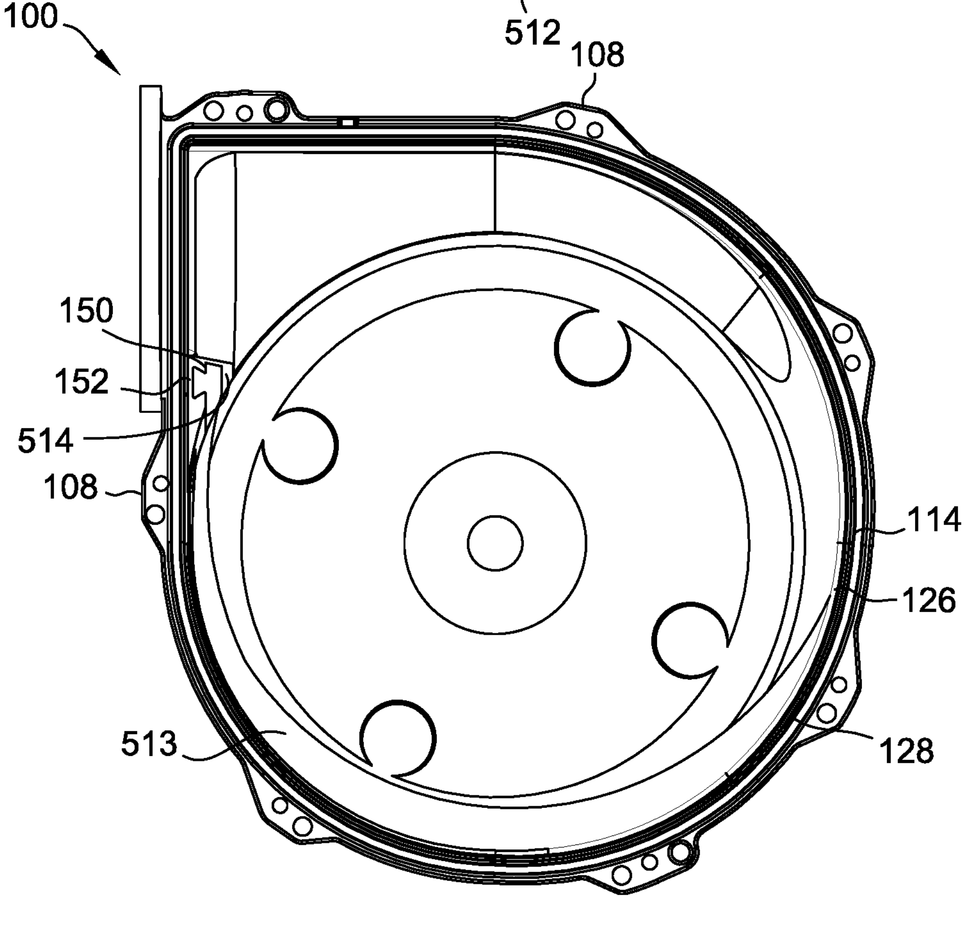

FIGS. 9 and 10 illustrate an alternative embodiment of a modular cutoff 500. Like components will be given like reference numerals for ease of understanding.

The modular cutoff 500 includes an abutting surface 512 and an angled surface 514. The abutting surface 512 abuts the surface 150 of the housing 108. A circumferential wall 513 extends circumferentially from the angled surface 514 and abuts the scroll wall 126 of the housing 108. The circumferential wall 513 of the modular cutoff 500 extends at least partially along the blower circumference 128 when the modular cutoff 500 is attached to the housing 108, changing the geometry of at least a portion of the length of scroll wall 126.

In some embodiments, the modular cutoff 500 further includes a corresponding attachment feature 510 extending from the abutting surface 512 of the modular cutoff 500. The corresponding attachment feature 510 of the modular cutoff 500 is configured to interdigitate with the attachment feature 152 of the housing 108. In the illustrated embodiment, the corresponding attachment feature 510 of the modular cutoff 500 is a dovetail tenon sized and configured to interdigitate with the dovetail mortise of the attachment feature 152 of the housing 108. In some embodiments, the modular cutoff 500 is held in place in the axis 120 direction by the removable side panel 116, mechanical fastener, snap, magnets and the like. In some embodiments, the modular cutoff 200 is attached to the surface of the blower housing 108 by way of one or more magnets embedded in at least one of the modular cutoff 500 and the surface of the blower housing 108. The corresponding modular feature 510 of the modular cutoff 500 operates in the same manner as the modular cutoff 500 as shown in FIGS. 4A, 4B and 5. The form of the attachment feature 510 of the modular cutoff 500 and the form of the attachment feature 152 of the housing 108 can be of any interlocking shape. Alternatively, the shape of the attachment feature 510 of the modular cutoff 500 and the shape of the attachment feature 152 of the housing 108 can be of any shape that enables blower assembly 100 to function as described herein.

As best shown in FIG. 10, the modular cutoff 500 is inserted into the attachment feature 152 of the housing 108. The angled surface 514 extends the cutoff point 135 of the scroll wall 126 by the angled surface 514 to an extended cutoff point 535, thereby circumferentially extending the blower circumference 128 by the angled surface 514 of the modular cutoff 500. Thus, the modular cutoff 500 changes the geometry of the scroll wall 126 by extending the blower circumference 128 by the angled surface 514 of the modular cutoff 500 and by the circumferential wall 513 extending from the angled surface 514.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A centrifugal blower assembly comprising:

a blower housing having a scroll wall defining a blower chamber, the scroll wall extending circumferentially between a cutoff point to an end point defining a blower circumference, the blower housing further having a surface adjacent to the cutoff point;

a side panel configured to be removably attached to the blower housing, the side panel defining an access opening; and a modular cutoff configured to attach to the surface of the blower housing, the modular cutoff having an abutting surface and a cutoff surface configured to extend the cutoff point of the blower by the cutoff surface to an extended cutoff surface, the modular cutoff including an elongate body having a first portion and a second portion, the first portion configured to be insertable through the access opening and the second portion configured to create an interference fit with the access opening to restrict air flow through the access opening.

2. The centrifugal blower assembly of claim 1, wherein the abutting surface of the modular cutoff further includes an attachment feature configured to mate to an attachment feature of the blower housing.

3. The centrifugal blower assembly of claim 2, wherein the attachment feature of the modular cutoff is a dovetail tenon configured to interdigitate with the attachment feature of the blower housing, the attachment feature of the blower housing having a mating joinery geometry.

4. The centrifugal blower assembly of claim 2, wherein the attachment feature of the modular cutoff has a shape configured to interdigitate with a shape of the attachment feature of the blower housing, the attachment feature of the blower housing having a mating joinery geometry.

5. The centrifugal blower assembly of claim 1, wherein the second portion is configured as a handle by which a user can manipulate the modular cutoff and insert the modular cutoff into the access opening of the side panel.

6. The centrifugal blower assembly of claim 1, wherein the second portion includes a frustoconical exterior surface creating the interference fit with the access opening.

7. The centrifugal blower assembly of claim 1, wherein the first portion of the modular cutoff includes the cutoff surface.

8. A method of assembling a centrifugal blower assembly, the method comprising:

forming a blower housing having a scroll wall defining a blower chamber, the scroll wall extending circumferentially between a cutoff point to an end point defining a blower circumference, the blower housing further having a surface adjacent to the cutoff point;

forming a side panel configured to be removably attachable to the blower housing, the side panel defining an access opening;

forming a modular cutoff having an abutting surface and a cutoff surface configured to extend the cutoff point of the blower by the cutoff surface to an extended cutoff surface, the modular cutoff including an elongate body having a first portion and a second portion, the first portion configured to be insertable through the access opening and the second portion configured to create an interference fit with the access opening to restrict air flow through the access opening; and attaching the modular cutoff to the surface of the blower housing.

9. The method of claim 8, wherein forming the modular cutoff further comprises forming an attachment feature of the abutting surface, the attachment feature configured to mate to an attachment feature of the blower housing.

10. The method of claim 9, wherein forming the attachment feature of the modular cutoff comprises forming a dovetail tenon configured to interdigitate with the attachment feature of the blower housing, the attachment feature of the blower housing having a mating joinery geometry.

11. The method of claim 9, wherein forming the attachment feature of the modular cutoff comprises forming the attachment feature into a shape configured to interdigitate with a shape of the attachment feature of the blower housing, the attachment feature of the blower housing having a mating joinery geometry.

12. The method of claim 8, wherein the second portion is configured as a handle by which a user can manipulate the modular cutoff and insert the modular cutoff into the access opening of the side panel.

* * * * *